(12) United States Patent
Wright (10) Patent No.: US 9,644,320 B2
(45) Date of Patent: May 9, 2017

(54) HIGH MOLECULAR WEIGHT AND HIGH CATIONIC CHARGE GLYOXALATED POLYACRYLAMIDE COPOLYMERS AND THEIR METHODS OF MANUFACTURE AND USE

(71) Applicant: BASF SE, Ludwigshafen (DE)

(72) Inventor: Matthew D. Wright, Smithfield, VA (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/913,750

(22) PCT Filed: Sep. 8, 2014

(86) PCT No.: PCT/US2014/054536
§ 371 (c)(1),
(2) Date: Feb. 23, 2016

(87) PCT Pub. No.: WO2015/035297
PCT Pub. Date: Mar. 12, 2015

(65) Prior Publication Data
US 2016/0201269 A1    Jul. 14, 2016

Related U.S. Application Data

(60) Provisional application No. 61/875,490, filed on Sep. 9, 2013.

(51) Int. Cl.
| | |
|---|---|
| *D21H 21/18* | (2006.01) |
| *D21H 19/24* | (2006.01) |
| *C08L 33/26* | (2006.01) |
| *D21H 17/45* | (2006.01) |
| *D21H 19/12* | (2006.01) |
| *D21H 21/20* | (2006.01) |
| *D21H 23/04* | (2006.01) |
| *D21H 23/24* | (2006.01) |
| *D21H 17/55* | (2006.01) |
| *D21H 17/37* | (2006.01) |
| *D21H 17/54* | (2006.01) |
| *D21H 19/20* | (2006.01) |

(52) U.S. Cl.
CPC .............. *D21H 19/24* (2013.01); *C08L 33/26* (2013.01); *D21H 17/375* (2013.01); *D21H 17/45* (2013.01); *D21H 17/455* (2013.01); *D21H 17/54* (2013.01); *D21H 17/55* (2013.01); *D21H 19/12* (2013.01); *D21H 19/20* (2013.01); *D21H 21/18* (2013.01); *D21H 21/20* (2013.01); *D21H 23/04* (2013.01); *D21H 23/24* (2013.01); *C08L 2201/54* (2013.01)

(58) Field of Classification Search
CPC ........ D21H 17/55; D21H 17/49; D21H 17/45; D21H 21/18; D21H 19/12; D21H 23/04; D21H 23/24; D21H 21/20
USPC ...................................................... 162/164.6
See application file for complete search history.

(56) References Cited

U.S. PATENT DOCUMENTS

| | | |
|---|---|---|
| 3,556,392 A | 1/1971 | Robin |
| 3,556,932 A | 1/1971 | Coscia et al. |
| 3,580,736 A | 5/1971 | Moyer et al. |
| 3,728,214 A | 4/1973 | Espy |
| 3,759,197 A | 9/1973 | Bracke |
| 4,103,742 A | 8/1978 | Swanson |
| 4,144,123 A | 3/1979 | Scharf et al. |
| 4,155,405 A | 5/1979 | Vio |
| 4,217,425 A | 8/1980 | Ballweber et al. |
| 4,421,602 A | 12/1983 | Brunnmueller et al. |
| 4,506,062 A | 3/1985 | Flesher et al. |
| 4,528,321 A | 7/1985 | Allen et al. |
| 4,599,379 A | 7/1986 | Flesher et al. |
| 4,603,176 A | 7/1986 | Bjorkquist et al. |
| 4,605,702 A | 8/1986 | Guerro et al. |
| 4,673,704 A | 6/1987 | Flesher et al. |
| 4,954,538 A | 9/1990 | Dauplaise et al. |
| 5,037,927 A | 8/1991 | Itagaki et al. |
| 5,041,503 A | 8/1991 | Dauplaise et al. |
| 5,085,787 A | 2/1992 | Pinschmidt, Jr. et al. |

(Continued)

FOREIGN PATENT DOCUMENTS

| | | |
|---|---|---|
| DE | 4413720 A1 | 10/1995 |
| EP | 0102760 A2 | 3/1984 |
| EP | 0126528 A2 | 11/1984 |
| EP | 0150933 A2 | 8/1985 |
| EP | 0170394 A2 | 2/1986 |
| GB | 1576447 A | 10/1980 |
| JP | 2003-238631 A | 8/2003 |
| WO | WO-95/29221 A1 | 11/1995 |
| WO | WO-9831748 A1 | 7/1998 |
| WO | WO-9831749 A1 | 7/1998 |
| WO | WO-0011046 A1 | 3/2000 |
| WO | WO-2006016906 A1 | 2/2006 |
| WO | WO-2006102059 A2 | 9/2006 |
| WO | WO-2008028865 A2 | 3/2008 |
| WO | WO-2009059725 A2 | 5/2009 |

OTHER PUBLICATIONS

Smook, Handbook for Pulp and Paper Technologies, 2nd. Ed., Angus Wilde Publications, 1992, pp. 207-208.

*Primary Examiner* — Mark Halpern (74) *Attorney, Agent, or Firm* — Drinker Biddle & Reath (57) ABSTRACT

A cellulose reactive glyoxalated copolymer composition and methods of producing and using the glyoxalated copolymer composition to, for instance, strengthen paper or board are discussed. A glyoxalated copolymer composition includes an aqueous medium containing a glyoxalated copolymer, wherein the glyoxalated copolymer is obtained by reaction in an aqueous reaction medium of a dry weight ratio of glyoxalxationic copolymer. The cationic copolymer can have a weight average molecular weight of about 120,000 to about 1 million Daltons, the cationic copolymer can include diallyldimethylammonium halide monomer and acrylamide monomer, and a ratio a ratio of the weight average molecular weight of the cationic copolymer before glyoxalation to weight % of diallyldimethylammonium halide monomer making up the cationic copolymer before glyoxalation can be equal to or greater than 4,000 or range from 4,000 to 40,000 Daltons/weight %.

21 Claims, 4 Drawing Sheets

(56) References Cited

U.S. PATENT DOCUMENTS

| | | | |
|---|---|---|---|
| 5,281,307 A | 1/1994 | Smigo et al. |
| 5,290,880 A | 3/1994 | Moench et al. |
| 5,320,711 A | 6/1994 | Dauplaise et al. |
| 5,374,334 A | 12/1994 | Sommese et al. |
| 5,723,022 A | 3/1998 | Dauplaise et al. |
| 5,863,879 A | 1/1999 | Zirnstein et al. |
| 6,001,920 A | 12/1999 | Ghafoor et al. |
| 6,031,037 A | 2/2000 | Ghafoor et al. |
| 6,159,340 A | 12/2000 | Niessner et al. |
| 6,576,086 B1 | 6/2003 | Ettl et al. |
| 6,616,807 B1 | 9/2003 | Dyllick-Brenzinger et al. |
| 6,797,785 B1 | 9/2004 | Hund et al. |
| 6,824,650 B2 | 11/2004 | Lindsay et al. |
| 6,824,659 B2 | 11/2004 | Bayley et al. |
| 7,034,068 B1 | 4/2006 | Negele et al. |
| 7,090,745 B2 | 8/2006 | Beckman et al. |
| 7,482,417 B2 | 1/2009 | Kiyosada et al. |
| 7,488,403 B2 | 2/2009 | Hagiopol et al. |
| 7,641,766 B2 | 1/2010 | St. John et al. |
| 7,670,459 B2 | 3/2010 | Garnier et al. |
| 7,875,676 B2 | 1/2011 | Wright |
| 7,902,312 B2 | 3/2011 | Gu et al. |
| 8,222,343 B2 | 7/2012 | Wright |
| 8,262,859 B2 | 9/2012 | Wright |
| 8,299,180 B2 | 10/2012 | Wright |
| 8,703,847 B2 | 4/2014 | Wright |
| 8,920,606 B2 | 12/2014 | Wright |
| 2004/0118540 A1 | 6/2004 | Garnier et al. |
| 2005/0161181 A1 | 7/2005 | St. John et al. |
| 2005/0187356 A1 | 8/2005 | Hagiopol et al. |
| 2006/0016906 A1 | 1/2006 | Matsumoto |
| 2006/0065380 A1 | 3/2006 | Garnier et al. |
| 2006/0162886 A1 | 7/2006 | Smith et al. |
| 2007/0078233 A1 | 4/2007 | Proverb et al. |
| 2008/0064819 A1 | 3/2008 | Wright |
| 2008/0308242 A1 | 12/2008 | Lu et al. |
| 2009/0223645 A1 | 9/2009 | Zhang et al. |
| 2011/0056640 A1 | 3/2011 | Cyr et al. |
| 2011/0083821 A1 | 4/2011 | Wright |
| 2011/0146925 A1 | 6/2011 | Bode et al. |

HIGH MOLECULAR WEIGHT AND HIGH CATIONIC CHARGE GLYOXALATED POLYACRYLAMIDE COPOLYMERS AND THEIR METHODS OF MANUFACTURE AND USE

FIELD OF THE DISCLOSURE

The present disclosure is directed toward cellulose reactive high molecular weight, high cationic charge glyoxalated copolymers made from acrylamide monomer and diallyldimethylammonium halide monomer. Methods of making and using such glyoxalated copolymers are also disclosed herein.

Compositions comprising the cellulose reactive high molecular weight, high cationic charge glyoxalated copolymers can be used as dry and wet strength aid for paper or board and may be applied to cellulosic slurry or paper or board furnish in the wet end or applied directly to a wet or dry web paper or wet or dry board.

BACKGROUND

Glyoxalated polyacrylamide (G-PAM) can be used in a variety of paper grades to provide paper with dry and temporary wet strength. For example, glyoxalated polyacrylamide can increase the initial wet strength of many household tissues which come in contact with water in use. Glyoxalated polyacrylamide can also be applied to increase the compression strength and the dimensional stability of many board-grade paper products.

Glyoxalated polyacrylamide has been prepared by reacting glyoxal with a cationic polyacrylamide in slightly alkaline aqueous solution and stabilized under acidic conditions. Glyoxalated polyacrylamides typically contain relatively low amounts of cationic monomer (about 5 mole percent) to limit the cationic charge contribution of this component.

U.S. Pat. No. 8,435,382 relates to storage-stable glyoxalated polyacrylamide polymers. The glyoxalated polyacrylamide polymer comprises from about 75% to about 10% acrylamide and from about 25% to about 90%, by weight cationic monomer, wherein the cationic monomer may include diallyldimethylammonium chloride monomer. These glyoxalated polyacrylamide polymers are used in an amount of at least 10% by weight to improve storage stability.

U.S. Patent Application Publication No. 2011/0056640 relates to resins useful for imparting strength to paper, the process of incorporating these resins into paper, and paper produced containing the resins. A reactive cationic resin comprising a copolymer produced from a comonomer which is dialdehyde reactive (acrylamide), a cationic comonomer (DADMAC), and a dialdehyde (glyoxal), wherein the cationic comonomer comprises greater than 10 mole % of the copolymer before reaction with dialdehyde.

Conventional G-PAMs have molecular weights of 100,000 Daltons or less to avoid gelation during the glyoxalation process. Also, increasing the ratio of DADMAC monomer to acrylamide monomer in G-PAMs increases the effective rate of pulp dewatering and allows for G-PAMs to be produced at a higher total solids concentration. However, increasing the ratio of DADMAC to acrylamide is expected to reduce strength efficiency, because the dry strength efficiency of G-PAMs is generally believed to derive from covalent bonds which form between the pendant aldehyde groups associated with glyoxal bound to amide groups from the acrylamide portion of the polymer. Due to this tradeoff, G-PAMs are conventionally made from acrylamide/DADMAC copolymers with a molecular weight in the range of 5,000 to 15,000 Daltons, and a weight ratio of acrylamide/DADMAC with a weight of acrylamide/DADMAC of 90-95 wt. % acrylamide to 10-5 wt. % DADMAC.

A need remains for a cellulose reactive glyoxalated copolymer that increases both the dewatering rate of a treated cellulosic slurry and also the dry strength of the paper/board made from the slurry.

SUMMARY

The present disclosure provides herein embodiments of a cellulose reactive glyoxalated copolymer composition. In one embodiment, the glyoxalated copolymer composition comprises: an aqueous medium containing about 0.25 to about 4 weight % of a glyoxalated copolymer, based on total weight of the aqueous medium, wherein the glyoxalated copolymer is obtained by reaction in an aqueous reaction medium of a dry weight ratio of glyoxal:cationic copolymer ranging from about 5 to about 40 glyoxal to about 95 to about 60 cationic copolymer; wherein the cationic copolymer has a weight average molecular weight of about 120,000 to about 1 million Daltons, based on total weight of the cationic copolymer before glyoxalation; wherein the cationic copolymer comprises about 15 to about 85 weight % diallyldimethylammonium halide monomer and about 85 to about 15 weight % acrylamide monomer, based on total weight of the cationic copolymer before glyoxalation; and wherein a ratio of the weight average molecular weight of the cationic copolymer before glyoxalation to weight % of diallyldimethylammonium halide monomer making up the cationic copolymer before glyoxalation is from greater than or equal to 4000 or ranging from 4000 to 40000, Daltons/weight %. In one embodiment, the glyoxalated copolymer composition comprises about 1 to about 3 weight % of the glyoxalated copolymer, based on the total weight of the aqueous solution. In one embodiment, the dry weight ratio of glyoxal:cationic copolymer ranges from about 10 to about 35 glyoxal to about 90 to about 65 cationic copolymer. In an embodiment of the glyoxalated copolymer composition, the cationic copolymer comprises about 20 to about 60 weight % diallyldimethylammonium halide monomer and about 80 to about 40 weight % acrylamide monomer.

In an embodiment of a glyoxalated copolymer composition, the cationic copolymer has a weight average molecular weight of about 120,000 to about 500,000 Daltons. In an embodiment of a glyoxalated copolymer composition, the cationic copolymer comprises about 20 to about 40 weight % diallyldimethylammonium halide monomer and about 80 to about 60 weight % acrylamide monomer, and has a weight average molecular weight of about 150,000 to about 400,000 Daltons. In an embodiment of a glyoxalated copolymer composition, the ratio of the weight average molecular weight of the cationic copolymer before glyoxalation to weight % of diallyldimethylammonium halide monomer making up the cationic copolymer before glyoxalation is from 7,000 to 12,000 Daltons/weight %. In an embodiment, the glyoxalated copolymer composition has a viscosity of less than or equal to 100 centipoise, preferably ranging from about 5 to about 100 centipoise. In an embodiment the glyoxalated copolymer composition has a viscosity of less than or equal to 30, preferably ranging from about 30 to about 5 centipoise.

The present disclosure provides herein embodiments of a method of making a cellulose reactive glyoxalated copolymer composition. In one embodiment, the method of making a cellulosic reactive glyoxalated copolymer composition comprises: reacting in an aqueous reaction medium a dry weight ratio of glyoxal:cationic copolymer ranging from about 5 to about 40 glyoxal to about 95 to about 60 cationic copolymer to form the glyoxalated copolymer; wherein the glyoxalated copolymer is about 0.25 to about 4 weight %, based on total weight of the aqueous reaction medium; wherein the cationic copolymer has a weight average molecular weight of about 120,000 to about 1 million Daltons; and wherein the cationic copolymer comprises about 15 to about 85 weight % diallyldimethylammonium halide monomer and about 85 to about 15 weight % acrylamide monomer, based on total weight of the cationic copolymer before glyoxalation. In an embodiment of the method, the dry weight ratio of glyoxal:cationic copolymer ranges from about 10 to about 30 dry glyoxal to about 90 to about 70 cationic copolymer to form the glyoxalated copolymer, wherein the glyoxalated copolymer is about 1 to about 3 weight %, based on total weight of the aqueous reaction medium. In an embodiment, the method further comprises, prior to the reacting step: polymerizing a mixture of about 15 to about 85 weight % diallyldimethylammonium halide monomer and about 85 to about 15 weight % acrylamide monomer to form the cationic copolymer, wherein a ratio of the weight average molecular weight of the cationic copolymer before glyoxalation to weight % of diallyldimethylammonium halide monomer making up the cationic copolymer before glyoxalation is equal to or greater than 4,000 or ranging from 4,000 to 40,000 Daltons/weight %. In one embodiment, the method further comprises, prior to the reacting step: polymerizing a mixture of about 20 to about 60 weight % diallyldimethylammonium halide monomer and about 80 to about 40 weight % acrylamide monomer to form the cationic copolymer, wherein the cationic copolymer has a weight average molecular weight of about 150,000 to about 400,000 Daltons, and wherein the ratio of the weight average molecular weight of the cationic copolymer before glyoxalation to weight % of diallyldimethylammonium halide monomer making up the cationic copolymer before glyoxalation is from 7,000 to 12,000 Daltons/weight %.

The present disclosure provides a method of making paper. In one embodiment, the method of making paper or board comprises one of: (a) combining a cellulose reactive glyoxalated copolymer composition and cellulose fibers; and (b) applying a glyoxalated copolymer composition to a wet/dry web or wet/dry paper or wet/dry board wherein the glyoxalated copolymer composition comprises: about 0.25 to about 4 weight % of a cellulose reactive glyoxalated copolymer in an aqueous medium, based on total weight of the aqueous medium, wherein the glyoxalated copolymer is obtained by reaction in an aqueous reaction medium of a dry weight ratio of glyoxal:cationic copolymer ranging from about 5 to about 40 glyoxal to about 95 to about 60 cationic copolymer; wherein the cationic copolymer has a weight average molecular weight of about 120,000 to about 1 million Daltons; wherein the cationic copolymer comprises about 15 to about 85 weight % diallyldimethylammonium halide monomer and about 85 to about 15 weight % acrylamide monomer, based on total weight of the cationic copolymer; and wherein a ratio of the weight average molecular weight of the cationic copolymer before glyoxalation to weight % of diallyldimethylammonium halide monomer making up the cationic copolymer before glyoxalation is greater than or equal to 4000 Daltons/weight % or from 4,000 to 40,000 Daltons/weight %. In one embodiment of the method of making paper, the combining step (a) is selected from the group consisting of: (a-i) adding the glyoxalated copolymer composition to an aqueous suspension of cellulose fibers; (a-ii) adding cellulose fibers to the glyoxalated copolymer composition; (a-iii) adding the glyoxalated copolymer composition and cellulose fibers to an aqueous solution; and (a-iv) reacting in an aqueous reaction medium comprising cellulose fibers a dry weight ratio of glyoxal:cationic copolymer ranging from about 5 to about 40 glyoxal to about 95 to about 60 cationic copolymer to form the glyoxalated copolymer, wherein the glyoxalated copolymer is about 0.25 to about 4 weight % based on total weight of the aqueous reaction medium.

The present disclosure provides embodiments of a paper or board internal strength additive or coating. In an embodiment the paper or board internal strength additive or coating comprises the glyoxalated copolymer composition, as discussed above. In an embodiment, a paper or board is coated with or comprises the glyoxalated copolymer, as discussed above. In an embodiment, the paper or board may be prepared by the method of any the proceeding methods.

It had been surprisingly discovered that when a ratio of the weight average molecular weight of the cationic copolymer before glyoxalation to weight % of diallyldimethylammonium halide monomer making up the cationic copolymer before glyoxalation is equal to or greater than 4,000 or ranges from 4,000 to 40,000 Daltons/weight %, then the glyoxalated copolymer compositions formed from the cationic copolymer improve water drainage during paper processing and strengthen the paper or board treated using the glyoxalated copolymer compositions.

It is to be understood that both the foregoing general description and the following detailed description are exemplary and explanatory and are intended to provide further explanation of the disclosed compounds, compositions, and methods.

Figure 1:
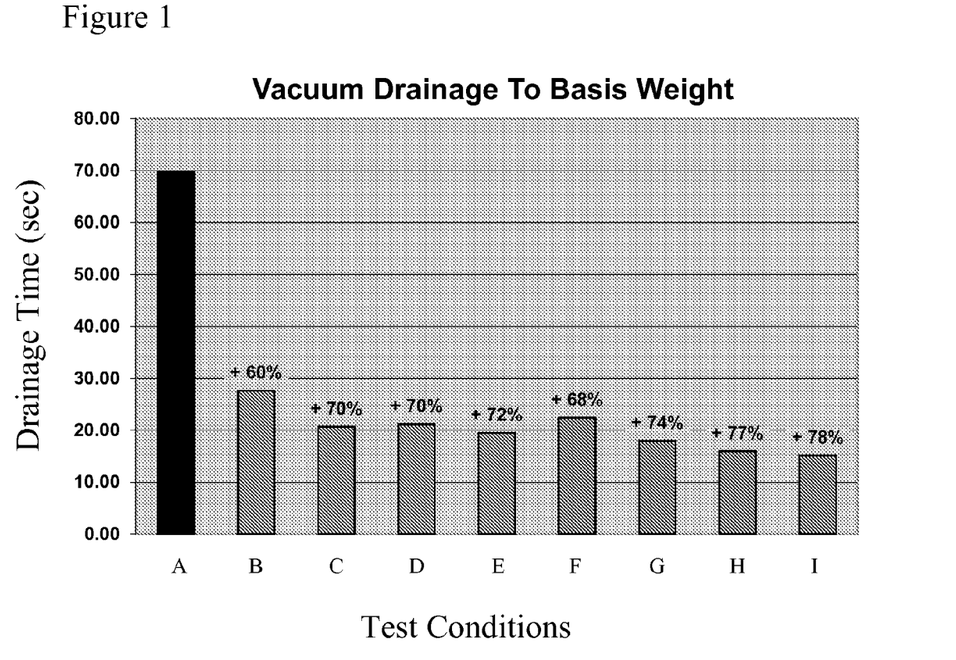
FIG. 1 is a bar graph plotting drainage time against basis weight for glyoxalated copolymer compositions of example 1.
Figure 2:
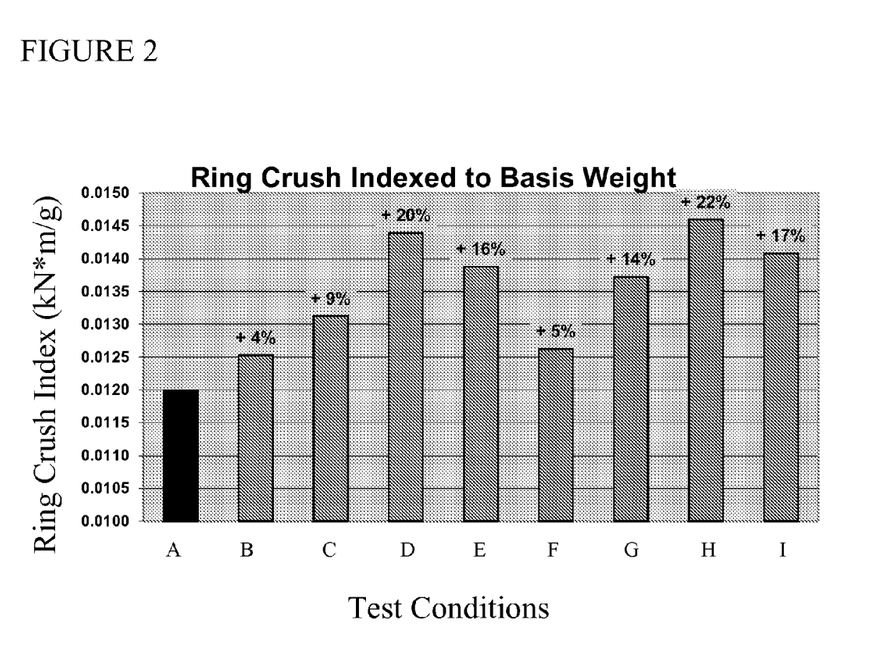
FIG. 2 is a bar graph plotting ring crushing index against basis weight for copolymer compositions of example 1.
Figure 3:
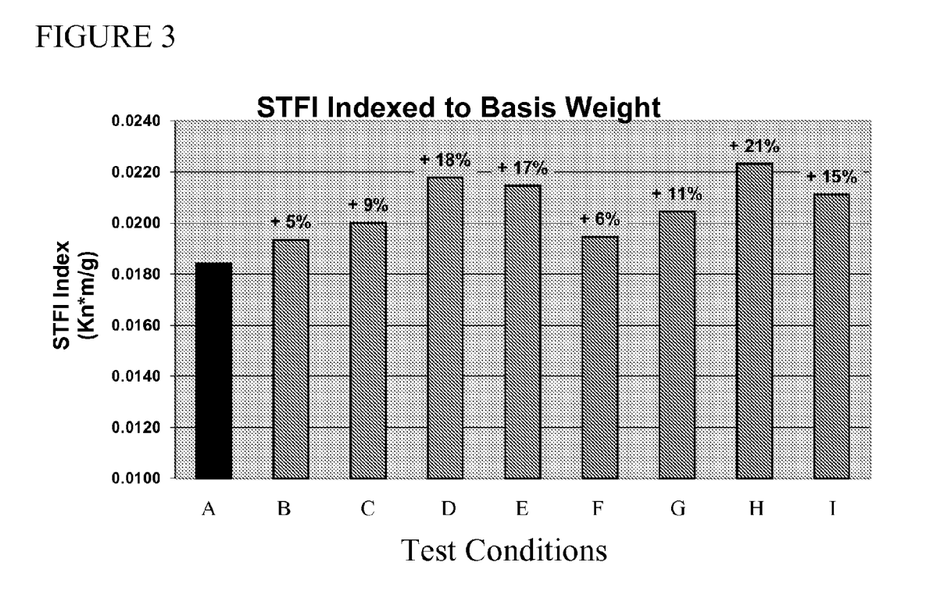
FIG. 3 is a bar graph plotting compressive strength (STFI) against basis weight for copolymer compositions of example 1.
Figure 4:
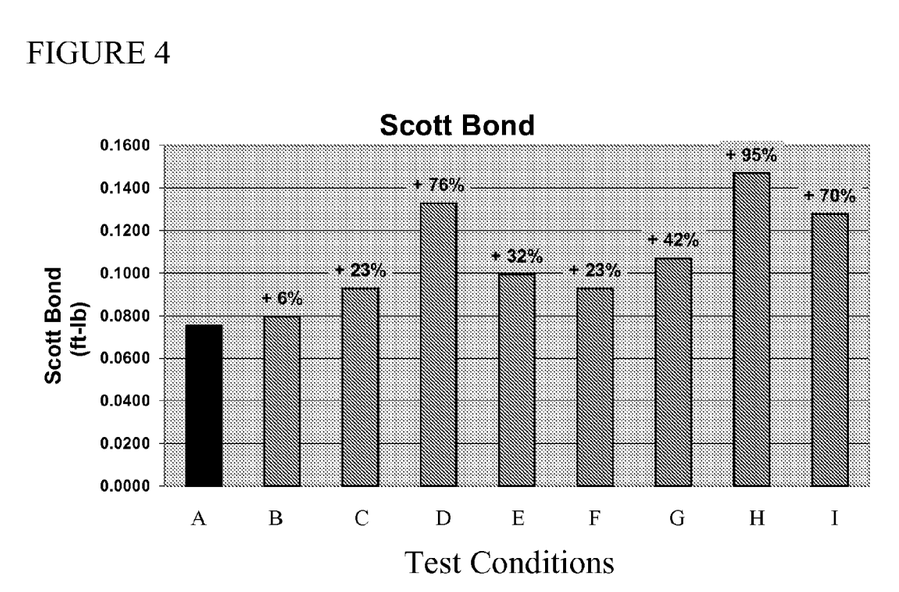
FIG. 4 is a bar graph plotting Scott Bond against basis weight for copolymer compositions of example 1.

The drawings are exemplary only, and should not be construed as limiting the claims and embodiments provided herein.

DETAILED DESCRIPTION

Select Definitions

The term "about" means that the number being described can deviate by plus or minus five percent of the number. For example, "about 250 g" means from 237.5-262.5 g. When the term "about" is used in a range, then the lower limit may be as much as minus 5% of the lower number and the upper limit may extend up to plus 5% of the upper number. For example, a range of about 100 to about 200 g indicates a range that extends from as low as 95 g up to 210 g.

For the purposes of the present disclosure, the reaction of the pendant amide groups of cationic copolymer with glyoxal is referred to as a "glyoxalation reaction" or simply "glyoxalation." The product of said glyoxalation reaction is referred to as "glyoxalated copolymer."

The term "cationic copolymer" refers to the starting copolymer before glyoxalation. Cationic copolymer can include non-ionic and anionic monomer so long as the aggregate charge of the copolymer is cationic.

A "catalyzed glyoxalation reaction" is a glyoxalation reaction carried out in an environment such that physical and/or chemical conditions cause the reaction to progress at a moderate to accelerated rate, wherein the desired reaction product is obtained in less than about 12 hours, or more preferably in less than 6 hours, less than 3 hours or even less than about 1 hour. The glyoxalation can be effected under alkaline conditions or by addition of a base or basic buffer.

The term "aqueous medium" or "aqueous reaction medium" refers to water or water comprising solvent, oils, and/or trace impurities. Weights expressed in terms of "based on total weight of the aqueous medium" refer to the weight of the water or water comprising solvent, oils, and/or trace impurities, and does not include the weight of additives, such as catalysts and reactants.

For the purposes of this disclosure, the term "substantially aqueous medium" or "substantially aqueous reaction medium" means that the aqueous medium or aqueous reaction medium contains less than 50% organic oil, including less than 20% organic oil, including less than 10% organic oil, including less than 5% organic oil, including less than 1% organic oil, less than 0.5% or 0.1% organic oil by weight of the glyoxalated copolymer. It is also possible that the substantially aqueous reaction medium is oil free. For example, it is known to glyoxalate a vinylamide polymer in an inverse micro-emulsion, which comprises both an oil phase and a water phase. The oil phase comprises at least one hydrocarbon. Typically the oil phase will be mineral oil, toluene, fuel oil, kerosene, odorless mineral spirits, or mixtures of the like.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

As envisioned in the present invention with respect to the disclosed compositions of matter and methods, in one aspect, the embodiments of the invention comprise the components and/or steps disclosed therein. In another aspect, the embodiments of the invention consist essentially of the components and/or steps disclosed therein. In yet another aspect, the embodiments of the invention consist of the components and/or steps disclosed therein.

Cellulose Reactive Glyoxalated Copolymer Composition

The present disclosure provides a cellulose reactive glyoxalated copolymer composition comprising an aqueous medium containing a glyoxalated copolymer. In an embodiment of the glyoxalated copolymer composition, the glyoxalated copolymer is contained in an amount of about 0.25 to about 4 weight %, including about 1 to about 3 weight %, including 1.5 to 2.5 weight %, based on total weight of the aqueous medium. When the amount of glyoxalated copolymer in the glyoxalated copolymer composition exceeds about 4 weight %, then gelation becomes a problem. When the amount of glyoxalated copolymer in the glyoxalated copolymer composition falls below 0.25 weight %, then the glyoxalated copolymer composition lacks utility as a paper processing additive.

In an embodiment of the glyoxalated copolymer composition, the glyoxalated copolymer is obtained by reaction in an aqueous reaction medium of a dry weight ratio of glyoxal:cationic copolymer ranging from about 5 to about 40 glyoxal to about 95 to about 60 cationic copolymer (i.e., about 5:95 to about 40:60), including from about 10 to about 30 glyoxal to about 90 to about 70 cationic copolymer (i.e., about 10:90 to about 30:70), including from about 12 to about 18 glyoxal to about 88 to about 82 cationic copolymer (i.e., about 12:88 to about 18:82). The weight percent of glyoxal and cationic polymer is based on the total weight of the dry reactants before the glyoxalation step.

In an embodiment of the glyoxalated copolymer composition, the cationic copolymer before glyoxalation has a weight average molecular weight of about 120,000 to about 1 million Daltons, including about 120,000 to about 500,000 Daltons, including about 150,000 to about 400,000 Daltons, including about 180,000 to about 250,000 Daltons, including about 200,000 to about 300,000 Daltons. Unless otherwise noted, all molecular weight is measure in units of Daltons and all "molecular weight" without further elaboration means a weight average molecular weight.

Thus the cellulose reactive glyoxalated copolymer composition comprising:

an aqueous medium containing about 0.25 to about 4 weight %, preferably about 1 to about 3 weight %, most preferably 1.5 to 2.5 weight % of a glyoxalated copolymer, based on total weight of the aqueous medium, wherein the glyoxalated copolymer is obtained by reaction in an aqueous reaction medium of a dry weight ratio of glyoxal:cationic copolymer ranging from about 5 to about 40 glyoxal to about 95 to about 60 cationic copolymer, preferably about 10 to about 35 dry glyoxal to about 90 to about 65 cationic;

wherein the cationic copolymer has a weight average molecular weight of about 120,000 to about 1 million Daltons, preferably about 120,000 to about 500,000, most preferably about 150,000 to about 300,000, especially about 150,000 to about 400,000 Daltons based on total weight of the cationic copolymer before glyoxalation;

wherein the cationic copolymer comprises about 15 to about 85 weight % diallyldimethylammonium halide monomer and about 85 to about 15 weight % acrylamide monomer, preferably about 20 to about 60 weight % diallyldimethylammonium halide monomer and about 80 to about 40 weight % acrylamide monomer, most preferably about 20 to about 40 weight % diallyldimethylammonium halide monomer and about 80 to about 60 weight % acrylamide monomer, based on total weight of the cationic copolymer before glyoxalation; and wherein a ratio of the weight average molecular weight of the cationic copolymer before glyoxalation to weight % of diallyldimethylammonium halide monomer making up the cationic copolymer before glyoxalation is equal to or greater than 4000 or 4000 to 40,000, preferably 5000 to 20,000, most preferably 4000 to 20,000 and especially 7,000 to 12,000 Daltons/weight %.

In an embodiment of the glyoxalated copolymer composition, the cationic copolymer for glyoxalation is a cationic copolymer comprising at least two different monomer units: vinylamide, e.g. acrylamide monomer, and diallyldimethylammonium halide monomer. In an embodiment, the cationic copolymer can include one, two, three, or more cationic or non-cationic monomer units. In a further embodiment, the cationic copolymer contains only vinylamide monomer and diallyldimethylammonium halide monomer. In an embodiment, the halide of the diallyldimethylammonium halide monomer can include Br, Cl, I, or F. For example, the diallyldimethylammonium halide monomer can be diallyldimethylammonium chloride (DADMAC).

Suitable cationic monomers or potentially cationic monomers include diallyldialkyl amines, 2-vinylpyridine, 2-(dialkylamino)alkyl(meth)acrylates, dialkylamino alkyl(meth)acrylamides, including acid addition and quaternary ammonium salts thereof. Specific examples of such cationic monomers or potentially cationic monomers are (meth)acryloyloxy ethyl trimethylammonium chloride(dimethyl amino ethyl(meth)acrylate, methyl chloride quaternary salt), 2-vinyl-N-methylpyridinium chloride, (p-vinylphenyl)-trimethylammonium chloride, (meth)acrylate 2-ethyltrimethylammonium chloride, 1-methacryloyl-4-methyl piperazine, Mannich poly acrylamides i.e. polyacrylamide reacted with dimethyl amine formaldehyde adduct to give the N-(dimethyl amino methyl) and (meth)acrylamido propyltrimethyl ammonium chloride.

Suitable anionic monomers may be selected from vinyl acidic material such as acrylic acid, methacrylic acid, maleic acid, allyl sulfonic acid, vinyl sulfonic acid, itaconic acid, fumaric acid, potentially anionic monomers such as maleic anhydride and itaconic anhydride and their alkali metal and ammonium salts, 2-acrylamido-2-methyl-propanesulfonic acid and its salts, sodium styrene sulfonate and the like.

Suitable non-ionic monomers other than the vinylamide may be selected from the group consisting of (meth)acrylic esters such as octadecyl(meth)acrylate, ethyl acrylate, butyl acrylate, methylmethacrylate, hydroxyethyl(meth)acrylate and 2-ethylhexylacrylate; N-alkyl acrylamides, N-octyl (meth)acrylamide, N-tert-butyl acrylamide, N-vinylpyrrolidone, N,N-dialkyl(meth)acrylamides such as N,N'-dimethyl acrylamide; styrene, vinyl acetate, hydroxy alkyl acrylates and methacrylate such as 2-hydroxy ethyl acrylate and acrylonitrile.

The cationic copolymer can be crosslinked, branched or otherwise structured or linear. For example, the cationic copolymer can be linear, crosslinked, chain-transferred, or crosslinked & chain-transferred (structured).

Cross linking agents are usually polyethylenically unsaturated crosslinking agents. Examples are methylene bis (meth)acrylamide, triallylammonium chloride; tetraallyl ammonium chloride, polyethyleneglycol diacrylate; polyethyleneglycol dimethacrylate; N-vinyl acrylamide; divinylbenzene; tetra(ethyleneglycol) diacrylate; dimethylallylaminoethylacrylate ammonium chloride; diallyloxyacetic acid, Na salt; diallyloctylamide; trimethyllpropane ethoxylate triacryalte; N-allylacrylamide N-methylallylacrylamide, pentaerythritol triacrylate and combinations thereof. Other systems for crosslinking can be used instead of or in addition to this. For instance covalent crosslinking through pendant groups can be achieved, for instance by the use of ethylenically unsaturated epoxy or silane monomers, or by the use of polyfunctional crosslinking agents such as silanes, epoxies, polyvalent metal compounds or other known crosslinking systems.

In an embodiment of the glyoxalated copolymer composition, the cationic copolymer comprises about 15 to about 85 weight % diallyldimethylammonium halide monomer and about 85 to about 15 weight % acrylamide monomer, including about 20 to about 60 weight % diallyldimethylammonium halide monomer and about 80 to about 40 weight % acrylamide monomer, including about 20 to about 40 weight % diallyldimethylammonium halide monomer and about 80 to about 60 weight % acrylamide monomer, based on total weight of the cationic copolymer before glyoxalation. The vinylamide content of the cationic copolymer provides the sites to which the cellulose reactive agent or glyoxal substituents can be attached. The minimum proportion of vinylamide units which should be present should be sufficient so that the glyoxalated polymer is thermosetting, such that the glyoxalated polymer forms a water-insoluble film when it is laid down from water solution on a glass plate and heated for 5 minutes at about 105° C.

It had been surprisingly discovered that when a ratio of the weight average molecular weight of the cationic copolymer before glyoxalation to weight % of diallyldimethylammonium halide monomer making up the total weight of the cationic copolymer before glyoxalation is equal to or greater than 4,000 or ranging from 4,000 to 40,000 Daltons/weight %, then the glyoxalated copolymer compositions formed from the cationic copolymer can both improve water drainage during paper processing and strengthen the paper or boards treated using the glyoxalated copolymer compositions.

In an embodiment of the glyoxalated copolymer composition, a ratio of the weight average molecular weight of the cationic copolymer before glyoxalation to weight % of diallyldimethylammonium halide monomer making up the cationic copolymer before glyoxalation is from 4,000 to 40000 Daltons/weight %, preferably 5000 to 20,000, most preferably 4000 to 20,000 and especially 7,000 to 12,000 Daltons/weight %.

In another embodiment, the ratio of the weight average molecular weight of the cationic copolymer before glyoxalation to weight % of diallyldimethylammonium halide monomer making up the cationic copolymer before glyoxalation is from 5,000 to 15,000 Daltons/weight %.

A sample calculation for this ratio proceeds as follows: a cationic copolymer having a weight average molecular weight of 250,000 Daltons and 25 weight % diallyldimethylammonium halide monomer, based on total weight of the cationic copolymer before glyoxalation, would have a ratio of (250,000 Daltons/25 weight %) is 10,000 Daltons/weight %.

It has been surprisingly discovered that, provided the weight average molecular weight of the cationic copolymer prior to glyoxalation is a weight average molecular weight of about 120,000 Daltons to 1 million Dalton and the percentage of diallyldimethylammonium halide monomer in the cationic copolymer before glyoxalation is about 15 to about 85 weight % diallyldimethylammonium, then the glyoxalated copolymer compositions formed from the cationic copolymer can both improve water drainage during paper processing and strengthen the paper or boards treated using the glyoxalated copolymer compositions.

In an embodiment of the glyoxalated copolymer composition, provided the weight average molecular weight of the cationic copolymer before glyoxalation is a weight average molecular weight of about 150,000 to about 500,000, and the percentage of diallyldimethylammonium halide monomer in the cationic copolymer before glyoxalation is about 15 to about 85 weight % diallyldimethylammonium, including about 20 to about 60 weight %, including about 20 to about 40 weight %, based on total weight of the cationic copolymer before glyoxalation, then the glyoxalated copolymer compositions formed from the cationic copolymer can both improve water drainage during paper processing and strengthen the paper or boards treated using the glyoxalated copolymer compositions.

In an embodiment of the glyoxalated copolymer composition, provided the weight average molecular weight of the cationic copolymer before glyoxalation is a weight average molecular weight of about 200,000 to about 300,000 Daltons, and the percentage of diallyldimethylammonium halide monomer in the cationic copolymer before glyoxalation is about 15 to about 85 weight % diallyldimethylammonium, including about 20 to about 60 weight %, including about 20 to about 40 weight %, based on total weight of the cationic copolymer before glyoxalation, then the glyoxalated copolymer compositions formed from the cationic copolymer can both improve water drainage during paper processing and strengthen the paper or boards treated using the glyoxalated copolymer compositions.

In an embodiment of the glyoxalated copolymer composition, the glyoxalated copolymer composition has a viscosity of equal to or less than 100 centipoise, preferably ranging from about 5 to about 100 centipoise. In an embodiment of the glyoxalated copolymer composition has a viscosity or less than or equal to 30, preferably ranging from about 30 to about 5 centipoise. including 30 to about 5 centipoise, including about 25 to about 10 centipoise, as measured using a Brookfield viscometer.

It had been surprisingly discovered that when a ratio of the weight average molecular weight of the cationic copolymer before glyoxalation to weight % of diallyldimethylammonium halide monomer making up the cationic copolymer before glyoxalation is from 4,000 to 40,000 Daltons/weight %, then the glyoxalated copolymer compositions formed from the cationic copolymer can both improve water drainage during paper processing and strengthen the paper or boards treated using the glyoxalated copolymer compositions.

The present disclosure further provides a paper or board internal strength additive or coating, which includes any of the embodiments of the glyoxalated copolymer composition discussed above.

The present disclosure also provides a paper or board coated with or comprising any of the embodiments of the glyoxalated copolymer composition discussed above. It is understood that the aqueous portion of a glyoxalated copolymer composition will be substantially absent from the finished paper or board coated with or comprising a glyoxalated copolymer composition, while the glyoxalated copolymer remains.

The glyoxalated copolymer may be added in the thick or thin stock. When added to the thin stock it may be added before the fan pump.

A substantial amount of wet or dry-strength is imparted when as little as about 0.1 to about 20 (0.05-kg/metric ton) pounds dry polymer per ton of dry furnish, about 1 to about 12 (0.5-6 kg/metric ton) about 1 to about 9(0.5-4.5 kg/metric ton), about 1 to about 8 (0.5-4 kg/metric ton) pounds dry polymer per ton of dry furnish is envisioned.

More typically ranges of 1.5 to about 6 (1.0-3 kg/metric ton) pounds dry polymer per ton of dry furnish are envisioned.

Method of Making a Glyoxalated Copolymer Composition

The present disclosure provides a method for making a glyoxalated copolymer composition comprising reacting in an aqueous reaction medium a glyoxal:cationic copolymer to form the glyoxalated copolymer composition. An embodiment of the method includes reacting in an aqueous reaction medium a dry weight ratio of glyoxal:cationic copolymer ranging from about 5:95 to about 40:60 (glyoxal:cationic copolymer), to form the glyoxalated copolymer composition. A further embodiment of the method includes reacting in an aqueous reaction medium a dry weight ratio of glyoxal:cationic copolymer ranging from about 5:95 to about 40:60, including from about 10:90 to about 30:70, including from about 12:88 to about 18:82, to form the glyoxalated copolymer composition.

The reaction of the cationic copolymer with glyoxal is carried out under conditions similar to those described with U.S. Pat. No. 7,8755,676 herein incorporated entirely by reference. The glyoxalation reaction of the polyvinylamide is carried out at concentrations of the polyvinylamide where gelation is prevented.

Base addition or changing the pH to above 7 is the most common method of catalyzing the glyoxalation reaction. Preferably, a pH range of 7 to 13 is generally considered to be a suitable catalytic environment for the reaction. For example, a pH range of 8 to 12 is especially appropriate. Alternatively, a concentrated pH buffer solution may be added to maintain pH.

In an embodiment of the method, the glyoxalated copolymer is present in the composition in an amount of about 0.25 to about 4 weight %, including about 1 to about 3 weight, including 1.5 to 2.5 weight percent %, based on total weight of the aqueous medium.

In an embodiment of the method, the cationic copolymer has a weight average molecular weight of about 120,000 to about 1 million Daltons, including about 120,000 to about 500,000 Daltons, including about 150,000 to about 400,000 Daltons, including about 180,000 to about 250,000 Daltons, including about 200,000 to about 300,000 Daltons.

In an embodiment of the method, the cationic copolymer for glyoxalation is a copolymer comprising at least two different monomer units: vinylamide monomer and diallyldimethylammonium halide monomer. In an embodiment of the method, the cationic copolymer comprises about 15 to about 85 weight % diallyldimethylammonium halide monomer and about 85 to about 15 weight % acrylamide monomer, including about 20 to about 60 weight % diallyldimethylammonium halide monomer and about 80 to about 40 weight % acrylamide monomer, including about 20 to about 40 weight % diallyldimethylammonium halide monomer and about 80 to about 60 weight % acrylamide monomer, based on total weight of the cationic copolymer before glyoxalation.

In an embodiment of the method, a ratio of the weight average molecular weight of the cationic copolymer before glyoxalation to weight % of diallyldimethylammonium halide monomer making up the cationic copolymer before glyoxalation is equal to or greater than 4,000 or ranging from 4,000 to 40,000 Daltons/weight %, preferably 5000 to 20,000, most preferably 4000 to 20,000 and especially 7,000 to 12,000 Daltons/weight %.

In another embodiment of the method, the ratio of the weight average molecular weight of the cationic copolymer before glyoxalation to weight % of diallyldimethylammonium halide monomer making up the cationic copolymer before glyoxalation is from 5,000 to 15,000 Dalton/weight % .

Accordingly the application is directed to a method of making a glyoxalated copolymer composition comprising:
reacting in an aqueous reaction medium a dry weight ratio of glyoxal:cationic copolymer ranging from about 5 to about 40 glyoxal to about 95 to about 60 cationic copolymer to form the cellulose reactive glyoxalated copolymer in an aqueous medium;

wherein the glyoxalated copolymer is about 0.25 to about 4 weight %, preferably about 1 to about 3 weight %, most preferably 1.5 to 2.5 weight % based on total weight of the aqueous reaction medium;

wherein the cationic copolymer has a weight average molecular weight of about 120,000 to about 1 million daltons, most preferably about 120,000 to about 500,000, especially about 150,000 to about 400,000 Daltons based on total weight of the cationic copolymer before glyoxalation; and wherein the cationic copolymer comprises about 15 to about 85 weight % diallyldimethylammonium halide monomer and about 85 to about 15 weight % acrylamide monomer, preferably about 20 to about 60 weight % diallyldimethylammonium halide monomer and about 80 to about 40 weight % acrylamide monomer, most preferably about 20 to about 40 weight % diallyldimethylammonium halide monomer and about 80 to about 60 weight % acrylamide monomer, based on total weight of the cationic copolymer before glyoxalation.

The present disclosure provides a method of making paper or board, which includes a step of combining a glyoxalated copolymer composition and cellulosic fiber slurry or applying a glyoxalated copolymer composition to a wet/dry web paper or wet/dry board. The glyoxalated copolymer composition can be one or more of the embodiments described above. In an embodiment of the method of making paper or board, the sequence in which the cellulose fibers are combined with the glyoxalated copolymer composition is not particularly limited. For example, the method can include adding the glyoxalated copolymer composition to an aqueous suspension of cellulose fibers; adding cellulose fibers to the glyoxalated copolymer composition; adding the glyoxalated copolymer composition and cellulose fibers to an aqueous solution; and/or reacting in an aqueous reaction medium comprising cellulose fibers a dry weight ratio of glyoxal:cationic copolymer ranging from about 5:95 to about 40:60 to form the glyoxalated copolymer, wherein the glyoxalated copolymer is about 0.25 to about 4 weight % based on total weight of the aqueous reaction medium. It is understood that the reacting step of forming a glyoxalated copolymer in the presence of cellulose fibers can further comprise embodiments of making the method of glyoxalated copolymer, as described above.

Monitoring of Glyoxalated Copolymer Formation

Viscosity is typically measured during the reaction using the UL adapter for a BROOKFIELD LV series viscometer. The UL adapter has no spindle number. Only one setting is possible. The base of the adapter cup is removed and the assembly is placed directly into the reaction mixture. Viscosity measurements are automatically recorded every second during the length of the catalyzed reaction. The viscometer is set to a speed of 60 rpm and the temperature of the reaction mixture is maintained at 25° C.

The glyoxalated copolymer may also be monitored by monitoring the consumption of glyoxal using methods known in the art. For example, one such method may include the method disclosed by Mitchel, R. E. J. et al. "The use of Girard-T reagent in a rapid and sensitive method for measuring glyoxal and certain other α-dicarbonyl compounds," Analytical Biochemistry, Volume 81, Issue 1, July 1977, Pages 47-56.

Batch or Continuous Mode

The cellulose reactive cationic copolymer may be synthesized in a batch or continuous mode. The embodiments herein are particularly favorable for implementation in a continuous reactor with pH measurement capability at the papermaking site.

The continuous reactor may be a tubular reactor.

Other variables which affect the rate of glyoxalation include, but are not limited to, pH, temperature, cationic copolymer weight average molecular weight, reaction mixture concentration, molar ratio between cationic copolymer and glyoxal, molar amide constituency of the cationic copolymer, and the presence of substances which interfere with the reaction.

The reaction is normally run at ambient temperatures. However the reaction may be carried out by the process of the disclosure over a wide temperature range.

The duration of the reaction necessary to obtain the desired product (e.g., 0.25 to 4 wt. % glyoxalated copolymer in the aqueous composition) will vary depending on concentration, temperature and pH, as well as other factors.

Other conventional additives which may be added to the glyoxalation reaction are chelating agents to remove polymerization inhibitors, pH adjusters, initiators, buffers, surfactants and other conventional additives.

Application of Glyoxalated Copolymer Composition

A glyoxalated copolymer composition of this disclosure can be used advantageously in the manufacture of paper. The glyoxalated copolymer composition can be applied to preformed paper by the tub or impregnation method, or by adding the solutions directly to paper-making fibrous suspensions at any point in the paper-making process where wet- and dry-strength resins are ordinarily applied.

The glyoxalated copolymer composition can be applied or incorporated in the wet-end of the papermaking process or applied to the wet paper. Alternatively, the glyoxalated copolymer composition can be applied to the dry paper or dry board.

The glyoxalated copolymer composition can be added to the thick or thin stock. When added to the thin stock, it may be added before the fan pump.

A substantial amount of wet- or dry-strength is imparted when as little as about 0.05 wt. % of the glyoxalated copolymer, based on dry fiber weight of the glyoxalated copolymer is added to the furnish.

For example, dosages of about 0.1 to about 20 (0.05-10 kg/metric ton) pounds dry polymer per ton of dry furnish, about 1 to about 12, (0.5-6 kg/metric ton) about 1 to about 9 (0.5-4.5 kg/metric ton), about 1 to about 8 (0.5-4 kg/metric ton) pounds dry polymer per ton of dry furnish is envisioned. More typically ranges of 1.5 to about 6 (1.0-3 kg/metric ton) pounds dry polymer per ton of dry furnish are envisioned.

Application of the glyoxalated copolymer composition to wet/dry paper or wet/dry board may be accomplished by any conventional means. Examples include but are not limited to size press, padding, spraying, immersing, printing or curtain coating.

Glyoxalated copolymer can be absorbed by the papermaking fibers at pH values ranging from about 3.5 to about 8.

Determination of Percent Glyoxal Consumed

The glyoxalation reaction can be monitored by the percent of glyoxal consumed.

The percent residual glyoxal can be determined from 2 wt. % aqueous solutions of the glyoxalated polyvinylamides. Residual glyoxal is removed from the glyoxalated polymer by dialysis through a 3500 MWCO membrane tubing. Ten milliliters (mls) of dialyzed sample is derivatized by adding 2.0 ml of o-(2,3,4,5,6 Pentafluorobenzyl)-hydroxyamine hydrochloride (6.6 mgs/ml) for approximately 2 hours. The glyoxal is then extracted from the dialysis solution using 1:1 hexane-diethyl ether. Analysis of the extract can be completed by gas chromatography on an HP 5890 GC #6 instrument using a DB 5 15 M 0.53 mm i.d 1.5 um df column. Once the residual glyoxal is determined and the amount of pre-reaction glyoxal is known, then the percent glyoxal consumed may be calculated, using methods known in the art. For example, one such method may include the method disclosed by Mitchel, R. E. J. et al. "The use of Girard-T reagent in a rapid and sensitive method for measuring glyoxal and certain other α-dicarbonyl compounds," Analytical Biochemistry, Volume 81, Issue 1, July 1977, Pages 47-56.

Laboratory Technique for Determining Starting Molecular Weight of the Polyvinylamide Polymer The following method can be used to subject various samples of glyoxalated polyacrylamide to conditions that break aldehyde-amide bonds and yield a polymer with the same Mw as the starting or "backbone" polymer.

For example, a 75% acrylamide/25% DADMAC polymer of Mw=100,561 can be used to form a glyoxalated copolymer composition, such that a 4 to 1 amide to glyoxal molar ratio is achieved, and the total solids of the reaction mixture is 2.0%. The reaction can be catalyzed by the addition of dilute sodium hydroxide to raise the solution pH to 9.5.

Average molecular weight can then be determined using a DAWN multi-angle light scattering detector in combination with a differential refractive index detector. In the light scattering experiment, the amount of light scattered at a given angle will be directly proportional to the weight average molar mass and the concentration. A second order Zimm plot is used to generate molar mass data with a do/dc (specific refractive index increment) value of 0.1800 (angles 4-15).

The following examples describe certain embodiments of this invention, but the invention is not limited thereto.

EXAMPLES

Example 1

PREPARATION OF POLYMERS

Example Polymer 1

A cationic copolymer (Example polymer 1) having a weight average molecular weight of 230,000 Daltons, and containing 25 weight % diallyldimethylammonium chloride monomer (DADMAC) and 75 weight % acrylamide was glyoxalated according to the procedure of U.S. Pat. No. 8,222,343, which is incorporated herein in its entirety. The glyoxalation reaction is run at 2 wt. % solids with the cationic copolymer concentration at approximately 1.7 wt. %. The glyoxal was added to give 0.3 wt. %. The glyoxal consumption is followed during the reaction.

Comparative Polymer 1

A cationic copolymer (Comparative Polymer 1) having a weight average molecular weight of 100,000 Daltons, and containing 10 weight % diallyldimethylammonium chloride monomer (DADMAC) and 90 weight % acrylamide is prepared in the same manner as Example Polymer 1.

Polymin® SK

An additive polyethylene amine (Polymin® SK, BASF) was included in specific experimental conditions to show the effect of adding a second cationic polymeric additive.

Polymer Characterization

Molecular Weight

Weight average Molecular weight of the starting polymer is determined by standard methods such as GPC. For example, the weight average molecular weight may be determined by conventional calibration techniques using acetate buffer and the following columns: TSK PWXL (Guard+G6000+G3000). Polyethylene oxide and polyethylene glycol standards may be used to calibrate the column set.

Paper Machine Pulp for Application Evaluation of Polymers

Paper pulp made from recycled corrugated containers is collected from a paper mill, and was analyzed for the following properties:

pH=6.89
Conductivity=2.16 mS/cm
Total Alkalinity=1406 mg/L
Total hardness=1700 mg/L
Cationic Demand=504 µeq/L
Canadian Standard Freeness=360
Consistency=1.09% solids Evaluation of the Dewatering Efficiency of Treated Pulp 300 ml aliquots of the paper pulp are measured, placed into 500 ml beakers and heated to 55 C. The beakers of heated pulp are then placed under overhead mixing, and dilute solutions of the example polymers are added in the prescribed amount. Once the polymers are added to the mixing pulp samples, the mixing is allowed to continue for a further 20 seconds. The beakers are then removed from mixing.

The treated pulp is then quickly added to a vacuum dewatering apparatus, with vacuum constantly and continuously. The apparatus consisted of a vacuum pump, which is connected by vacuum tubing to the side arm of a one liter vacuum flask. The vacuum flask is fitted on the top opening with a rubber gasket and a Buchner funnel, such that the apparatus is air tight, except for the opening of the funnel. The inside of the Buchner funnel is lined with a pre-wetted Whatman 541 filter paper. Once the treated pulp is added to the funnel, the time required to pull the free liquid through the filter, and break the liquid seal in the funnel, is measured in seconds. A shorter time in seconds to dewater a treated pulp aliquot represents a better result.

Each Test Condition is run in duplicate, and the results are averaged and presented in Table 1.

TABLE 1

Drainage Time for Example 1 Polymer and Comparative Polymer 1
Vacuum Drainage

| Test Condition | Additive 1 | Additive 2 | Drainage Time (sec) (percentage of drainage reduction) |
|---|---|---|---|
| A | Blank | None | 69.74 |
| B | 2 lbs/ton Comparative Polymer 1 | None | 27.62 (+60.40%) |
| C | 4 lbs/ton Comparative Polymer 1 | None | 20.62 (+70.43%) |
| D | 8 lbs/ton Comparative Polymer 1 | None | 21.19 (+69.62%) |
| E | 4 lbs/ton Comparative Polymer 1 | 5 lbs/ton Polymin SK | 19.50 (+72.04%) |
| F | 2 lbs/ton Example Polymer 1 | None | 22.39 (+67.89%) |
| G | 4 lbs/ton Example Polymer 1 | None | 17.94 (+74.28%) |
| H | 8 lbs/ton Example Polymer 1 | None | 15.97 (+77.10%) |

TABLE 1-continued

Drainage Time for Example 1 Polymer and Comparative Polymer 1 Vacuum Drainage

| Test Condition | Additive 1 | Additive 2 | Drainage Time (sec) (percentage of drainage reduction) |
|---|---|---|---|
| I | 4 lbs/ton Example Polymer 1 | 5 lbs/ton Polymin SK | 15.16 (+78.27%) |

In the experiment, for each weight basis, test conditions using Example Polymer 1 (Test Conditions B-D) had a reduced drainage time by 4-7% relative to test conditions using the Comparative Polymer 1. This result indicates that Test conditions using an average molecular weight of 230,000 Daltons, and containing 25 weight % diallyldimethylammonium chloride monomer exhibited improved drainage time relative to a comparative weight basis of test conditions using an average molecular weight of 100,000 Daltons, and containing 10 weight % diallyldimethylammonium chloride monomer. Further, comparing test condition E and G, it is clear that the presence of a second complimentary cationic polymer (Polymin® SK) improves the performance of Comparative Polymer 1, however it does not bring the results from comparative polymer 1 to an equal performance level to Example Polymer 1.

Dry Strength

Next, 150 gram per square meter TAPPI Standard handsheets were prepared using the same fiber furnish used in the dewatering experiment above. under the conditions listed below:

Handsheet were pressed at 40 psi and dried on a drum dryer at 240° F. for three minutes Each test condition was repeated five times.

The handsheets are conditioned overnight at 72° F. and 50% Relative Humidity. (72° F.±5° F., 50%±5% R.H.). The handsheets are tested for Ring Crush, STFI, Scott Bond. The Ring Crush and STFI results were divided by the individual sheet weights to arrive at an Indexed value for each test. The Indexed results for Ring Crush and STFI, as well as the non-Indexed results of the Scott Bond tests are shown in Table 2.

TABLE 2

Test Results Indexed to Basis Weight

| Test Condition | Additive 1 | Additive 2 | Ring Crush Index (Kn * m/g) Average | STFI Index (Kn * m/g) Average | Scott Bond (ft-lb) Average (not indexed) |
|---|---|---|---|---|---|
| A | Blank | none | 0.0120 | 0.0184 | 0.0754 |
| B | 2 lbs/ton Comparative Polymer 1 | none | 0.0125 (+4.46%) | 0.0193 (+5.07%) | 0.0796 (+5.58%) |
| C | 4 lbs/ton Comparative Polymer 1 | none | 0.0131 (+9.45%) | 0.02 (+8.67%) | 0.0928 (+23.18%) |
| D | 8 lbs/ton Comparative Polymer 1 | none | 0.0144 (+20.04%) | 0.0218 (+18.29%) | 0.1328 (+76.26%) |
| E | 4 lbs/ton Comparative Polymer 1 | 5 lbs/ton Polymin SK | 0.0139 (+15.72%) | 0.0215 (+16.53%) | 0.0993 (+31.84%) |
| F | 2 lbs/ton Example Polymer 1 | none | 0.0126 (+5.29%) | 0.0195 (+5.68%) | 0.0928 (+23.18%) |
| G | 4 lbs/ton Example Polymer 1 | none | 0.0137 (+14.45%) | 0.0205 (+11.09%) | 0.1070 (+41.93%) |
| H | 8 lbs/ton Example Polymer 1 | none | 0.0146 (+21.72%) | 0.0223 (+21.20%) | 0.1470 (+95.01%) |
| I | 4 lbs/ton Example Polymer 1 | 5 lbs/ton Polymin SK | 0.0141 (+17.43%) | 0.0211 (+14.65%) | 0.1278 (+69.63%) |

In a comparison of Test Conditions F-H against comparative Test Conditions B-D, each experimental condition containing Example Polymer 1 was observed to have a higher average test result for Ring Crush Index, STFI Index, and Scott Bond, when compared to the corresponding experimental conditions containing Comparative Polymer 1.

Test Condition Analytical Methods

Ring Crush

Ring Crush was determined using a MESSMER BÜCHEL CRUSH TESTER model K440 according to TAPPI T 822 method. Ring crush is a physical test of the paper or board strength, and generally, higher is better.

STFI

Compression STFI was determined using a MESSMER-BÜCHEL Model K455, according to TAPPI T 826 method. STFI is a measure of the compressive strength of paper or board.

Scott-Bond

Scott Bond was measured using a TAPPI UM-403 or Huygen Internal Bond Tester. Scott Bond is a measure of the internal bond strength of paper or board.

Example 2

A series of 11 acrylamide:DADMAC copolymers are produced with a range of Mw and Weight % DADMAC, to show the effect of these two variables on the dry strength and dewatering performance of glyoxalated adducts of these copolymers. Table 3 contains Mw and weight % DADMAC details of the example copolymers.

TABLE 3

Series of acrylamide:DADMAC copolymers tested for dry strength and dewatering performance.

| Sample ID | DADMAC Wt % | Mw | Daltons/wt. % |
|---|---|---|---|
| 2A | 10 | 12,000 | 1200 |
| 2B | 25 | 13,851 | 555 |
| 2C | 50 | 11,931 | 238 |
| 2D | 10 | 101,128 | 10,000 |
| 2E | 25 | 92,582 | 3,700 |
| 2F | 50 | 80,200 | 1,600 |
| 2G | 10 | 240,140 | 24,000 |
| 2H | 25 | 256,391 | 10,255 |
| 2I | 50 | 263,598 | 5,300 |
| 2J | 10 | 659,200 | 65,920 |
| 2K | 25 | 415,920 | 16,700 |

Each of the eleven starting copolymers are glyoxalated by mixing 85 parts by weight on a solid basis of each copolymer with 15 parts by weight on a solid basis of glyoxal in a dilute aqueous solution. Each reaction solution is held at 20° C., and the pH was raised and held constant at pH 10.0 by dropwise addition of a 10% aqueous sodium hydroxide solution. After holding the pH of the reaction solution at 10.0 for 30 minutes, the pH is lowered to 4.0 with the dropwise addition of a 10% aqueous sulfuric acid solution.

The turbidity of each pre-reaction solution and post-reaction solution is measured, and the change in turbidity as a result of the reaction is expressed as the "net turbidity change" in the table below. The concentration of free glyoxal in each reaction solution is measured before and after each reaction, and the concentration present in each post-reaction solution is expressed as a percentage of the starting concentration of glyoxal in the table below. The concentration of copolymer and glyoxal at which, or above which, the reaction solution forms an insoluble gel as a result of the prevailing reaction conditions is determined, and is expressed as the "gel concentration" in the table 4 below.

TABLE 4

Reaction Conditions for Samples in Table 3

| Sample ID | Reaction solids Concentration | Net Turbidity Change | % Free Glyoxal | Gel Concentration |
|---|---|---|---|---|
| 2A | 2.0% | 2.71 | 47.30% | 10.9% |
| 2B | 2.0% | −0.93 | 46.38% | 11.7% |
| 2C | 2.0% | 0.44 | 50.12% | 19.0% |
| 2D | 2.0% | 9.34 | 44.69% | 3.1% |
| 2E | 2.0% | 0.86 | 44.67% | 4.8% |
| 2F | 2.0% | 0.24 | 50.32% | 6.8% |
| 2G | 1.0% | 2.31 | 51.79% | 1.5% |
| 2H | 1.0% | 33.65 | 50.50% | 1.8% |
| 2I | 1.0% | 16.43 | 50.75% | 2.0% |
| 2J | 1.0% | −0.28 | 53.44% | 1.3% |
| 2K | 1.0% | 2.61 | 55.33% | 1.4% |

Evaluation of the Eleven Glyoxalated Copolymer Adducts for Dry Strength Efficacy (Tables 3 and 4)

The adducts formed by glyoxalation of the eleven starting copolymers, as described above, are incorporated into paper handsheets to determine the efficacy of each adduct as a paper dry strength aid. A papermaking thinstock is made by combining thickstock and whitewater collected from a 100% recycled linerboard paper mill. The thinstock is characterized as follows:

Consistency=0.72%
Freeness=300 CSF
PH=6.95
Conductivity=2700 μS
Alkalinity=599 mg/L
Hardness=840 mg/L
Charge Demand=−292 μeq/L To produce the paper handsheets, 425 ml aliquots of the thinstock are heated to 50° C., and the adducts are added to the thinstock under mixing at addition levels of 0.1%, 0.2% and 0.4% based on oven dry pulp solids. The thinstock is mixed for an additional 20 seconds after adduct addition, and then the treated thinstock is added to a 6.25 inch round sheet mold. The handsheets are pressed at 40 psi on a roll press and dried at 240 F on a steam heated drum dryer.

Each test condition is repeated four times, to produce four separate handsheets. The handsheets are conditioned overnight at standard laboratory conditions (72° F., 50% relative humidity). The handsheets are tested for Ring Crush and short span compression (SCT) strength and basis weight. The Ring Crush and SCT results are divided by the Basis Weight of each corresponding handsheet, to arrive at a strength value which is indexed to sheet basis weight. The averaged results from the four handsheets corresponding to each experimental condition are shown in the Table 5 below.

TABLE 5

Ring Crush and Dry Strength Efficiency of Glyoxalted Samples of Table 3
Dry Strength Results Indexed to Basis Weight

| | | Ring Crush Index (Kn * m/g) | SCT Index (Kn * m/g) |
|---|---|---|---|
| | Blank | 0.0149 | 0.0229 |
| Adduct 2A | 0.10% | 0.0145 | 0.0232 |
| | 0.20% | 0.0144 | 0.0228 |
| | 0.40% | 0.0144 | 0.0227 |

TABLE 5-continued

Ring Crush and Dry Strength Efficiency of
Glyoxalted Samples of Table 3
Dry Strength Results Indexed to Basis Weight

|  |  | Ring Crush Index (Kn * m/g) | SCT Index (Kn * m/g) |
|---|---|---|---|
| Adduct 2B | 0.10% | 0.0148 | 0.0223 |
|  | 0.20% | 0.0146 | 0.0221 |
|  | 0.40% | 0.0147 | 0.0222 |
| Adduct 2C | 0.10% | 0.0148 | 0.0225 |
|  | 0.20% | 0.0149 | 0.0232 |
|  | 0.40% | 0.0148 | 0.0235 |
| Adduct 2D | 0.10% | 0.0151 | 0.0233 |
|  | 0.20% | 0.0152 | 0.0232 |
|  | 0.40% | 0.0159 | 0.0244 |
| Adduct 2E | 0.10% | 0.0152 | 0.022 |
|  | 0.20% | 0.0155 | 0.022 |
|  | 0.40% | 0.0164 | 0.0242 |
| Adduct 2F | 0.10% | 0.0152 | 0.023 |
|  | 0.20% | 0.0159 | 0.023 |
|  | 0.40% | 0.0164 | 0.0233 |
| Adduct 2G | 0.10% | 0.0154 | 0.0234 |
|  | 0.20% | 0.0161 | 0.0244 |
|  | 0.40% | 0.0168 | 0.0253 |
| Adduct 2H | 0.10% | 0.0151 | 0.022 |
|  | 0.20% | 0.0158 | 0.0247 |
|  | 0.40% | 0.0161 | 0.025 |
| Adduct 2I | 0.10% | 0.0155 | 0.0232 |
|  | 0.20% | 0.0161 | 0.0237 |
|  | 0.40% | 0.0168 | 0.0252 |
| Adduct 2J | 0.10% | 0.0154 | 0.0233 |
|  | 0.20% | 0.0158 | 0.0229 |
|  | 0.40% | 0.0166 | 0.0241 |
| Adduct 2K | 0.10% | 0.0151 | 0.023 |
|  | 0.20% | 0.0153 | 0.0237 |
|  | 0.40% | 0.0167 | 0.0254 |

Evaluation of the Eleven Glyoxalated Copolymer Adducts for Efficiency in Thinstock Dewatering and Colloidal Retention 300 ml aliquots of the paper thinstock are measured, placed into 500 ml beakers and heated to 50 C. The beakers of heated pulp are then placed under overhead mixing, and dilute solutions of the copolymer adducts are added in the prescribed amount. Once the polymers are added to the mixing pulp samples, the mixing is allowed to continue for a further 20 seconds. The beakers are then removed from mixing.

The treated pulp is then quickly added to a vacuum dewatering apparatus, with vacuum pressure applied constantly and continuously. The apparatus consisted of a vacuum pump, which is connected by vacuum tubing to the side arm of a one liter vacuum flask. The vacuum flask is fitted on the top opening with a rubber gasket and a Buchner funnel, such that the apparatus is air tight, except for the opening of the funnel. The inside of the Buchner funnel is lined with a pre-wetted Whatman 541 filter paper. Once the treated pulp is added to the funnel, the time required to pull the free liquid through the filter, and break the liquid seal in the funnel, is measured in seconds. A shorter time in seconds to dewater a treated pulp represents an improved result.

After completing each vacuum drainage test, the turbidity of the filtrate water present in the vacuum flask is measured. A reduction in filtrate water turbidity indicates that the copolymer adduct has removed colloidal particles from the filtrate water by fixing those particles on the papermaking fibers.

Each test condition is repeated twice. Drainage Time and Turbidity is recorded for each test run. The results are presented in the table 6 below:

TABLE 6

Dewatering and Turbidity Results
Dewatering and Turbidity Results

|  |  | Drainage Time Seconds | Filtrate Turbidity NTUs |
|---|---|---|---|
| Blank |  | 30.55 | 217 |
| Adduct 2A | 0.10% | 22.43 | 223.8 |
|  | 0.20% | 22.42 | 220.5 |
|  | 0.40% | 32.61 | 220.5 |
| Adduct 2B | 0.10% | 26.42 | 227.5 |
|  | 0.20% | 28.69 | 213.4 |
|  | 0.40% | 26.13 | 218.6 |
| Adduct 2C | 0.10% | 23.29 | 223.4 |
|  | 0.20% | 32.21 | 218.6 |
|  | 0.40% | 28.19 | 223.4 |
| Adduct 2D | 0.10% | 20.85 | 186.4 |
|  | 0.20% | 23.97 | 160.4 |
|  | 0.40% | 18.94 | 152.6 |
| Adduct 2E | 0.10% | 17.4 | 180.8 |
|  | 0.20% | 20.09 | 159.2 |
|  | 0.40% | 23.96 | 143.7 |
| Adduct 2F | 0.10% | 20.05 | 170.2 |
|  | 0.20% | 18.85 | 145.6 |
|  | 0.40% | 21.03 | 128.2 |
| Adduct 2G | 0.10% | 20.06 | 169.8 |
|  | 0.20% | 17.29 | 142.7 |
|  | 0.40% | 16.16 | 117.9 |
| Adduct 2H | 0.10% | 17 | 169 |
|  | 0.20% | 16.57 | 141.9 |
|  | 0.40% | 18.23 | 120.4 |
| Adduct 2I | 0.10% | 15.36 | 164.3 |
|  | 0.20% | 17.9 | 138.7 |
|  | 0.40% | 15.04 | 115 |
| Adduct 2J | 0.10% | 17.63 | 192.7 |
|  | 0.20% | 20.17 | 164.7 |
|  | 0.40% | 20.83 | 141 |
| Adduct 2K | 0.10% | 16.31 | 167.6 |
|  | 0.20% | 18.02 | 143.1 |
|  | 0.40% | 14.51 | 120.7 |

All cited patents and publications referred to in this application are herein incorporated by reference in their entirety for all purposes.

What is claimed is:

1. A cellulose reactive glyoxalated copolymer composition comprising:
   an aqueous medium containing about 0.25 to about 4 weight %, of a glyoxalated copolymer, based on total weight of the aqueous medium,
   wherein the glyoxalated copolymer is obtained by reaction in an aqueous reaction medium of a dry weight ratio of glyoxal:cationic copolymer ranging from about 5 to about 40 glyoxal to about 95 to about 60 cationic copolymer;
   wherein the cationic copolymer has a weight average molecular weight of about 120,000 to about 1 million Daltons based on total weight of the cationic copolymer before glyoxalation;
   wherein the cationic copolymer comprises about 15 to about 85 weight % diallyldimethylammonium halide monomer and about 85 to about 15 weight % acrylamide monomer, based on total weight of the cationic copolymer before glyoxalation; and
   wherein a ratio of the weight average molecular weight of the cationic copolymer before glyoxalation to weight % of diallyldimethylammonium halide monomer making up the cationic copolymer before glyoxalation is greater than or equal to 4000 Daltons/weight %.

2. The cellulose reactive glyoxalated copolymer composition of claim 1, wherein the glyoxalated copolymer composition comprises about 1 to about 3 weight % of the glyoxalated copolymer, based on the total weight of the aqueous medium.

3. The cellulose reactive glyoxalated copolymer composition according to claim 1, wherein the dry weight ratio of glyoxal:cationic copolymer ranges from about 10 to about 35 glyoxal to about 90 to about 65 cationic copolymer.

4. The cellulose reactive glyoxalated copolymer composition according to claim 1, wherein the cationic copolymer comprises about 20 to about 60 weight % diallyldimethylammonium halide monomer and about 80 to about 40 weight % acrylamide monomer.

5. The cellulose reactive glyoxalated copolymer composition according to claim 1, wherein the cationic copolymer has a weight average molecular weight of about 120,000 to about 500,000 Daltons.

6. The cellulose reactive glyoxalated copolymer composition according to claim 1, wherein the cationic copolymer comprises about 20 to about 40 weight % diallyldimethylammonium halide monomer and about 80 to about 60 weight % acrylamide monomer, and has a weight average molecular weight of about 150,000 to about 400,000 Daltons.

7. The cellulose reactive glyoxalated copolymer composition according to claim 1, wherein the ratio of the weight average molecular weight of the cationic copolymer before glyoxalation to weight % of diallyldimethylammonium halide monomer making up the cationic copolymer before glyoxalation is from 4,000 to 40,000 Daltons/weight %.

8. The cellulose reactive glyoxalated copolymer composition according to claim 1, wherein the ratio of the weight average molecular weight of the cationic copolymer before glyoxalation to weight % of diallyldimethylammonium halide monomer making up the cationic copolymer before glyoxalation is from 5,000 to 20,000 Daltons/weight %.

9. The cellulose reactive glyoxalated copolymer composition according to claim 1, having a viscosity of less than or equal to 100 centipoise.

10. The cellulose reactive glyoxalated copolymer composition according to claim 1, having a viscosity of less than or equal about 30 centipoise.

11. A paper or board comprising the cellulose reactive glyoxalated copolymer composition the according to claim 1.

12. A method of making a glyoxalated copolymer composition comprising:
reacting in an aqueous reaction medium a dry weight ratio of glyoxal:cationic copolymer ranging from about 5 to about 40 glyoxal to about 95 to about 60 cationic copolymer to form the cellulose reactive glyoxalated copolymer in an aqueous medium;
wherein the glyoxalated copolymer is about 0.25 to about 4 weight % based on total weight of the aqueous reaction medium;
wherein the cationic copolymer has a weight average molecular weight of about 120,000 to about 1 million Daltons based on total weight of the cationic copolymer before glyoxalation; and
wherein the cationic copolymer comprises about 15 to about 85 weight % diallyldimethylammonium halide monomer and about 85 to about 15 weight % acrylamide monomer, based on total weight of the cationic copolymer before glyoxalation.

13. The method according to claim 12, wherein the dry weight ratio of glyoxal:cationic copolymer ranges from about 10 to about 35 dry glyoxal to about 90 to about 65 cationic copolymer to form the glyoxalated copolymer,
wherein the glyoxalated copolymer is about 1 to about 3 weight %, based on total weight of the aqueous reaction medium.

14. The method according to claim 12, further comprising prior to the reacting step:
polymerizing a mixture of about 15 to about 85 weight % diallyldimethylammonium halide monomer and about 85 to about 15 weight % acrylamide monomer to form the cationic copolymer,
wherein a ratio of the weight average molecular weight of the cationic copolymer before glyoxalation to weight % of diallyldimethylammonium halide monomer making up the cationic copolymer before glyoxalation is greater than or equal to 4000Daltons/weight %.

15. The method according to claim 14, further comprising, prior to the reacting step:
polymerizing a mixture of about 20 to about 60 weight % diallyldimethylammonium halide monomer and about 80 to about 40 weight % acrylamide monomer to form the cationic copolymer,
wherein the cationic copolymer has a weight average molecular weight of about 150,000 to about 500,000 Daltons, and
wherein the ratio of the weight average molecular weight of the cationic copolymer before glyoxalation to weight % of diallyldimethylammonium halide monomer making up the cationic copolymer before glyoxalation is from 5,000 to 20,000 Daltons/weight %.

16. A method of making paper or board comprising one of:
(a) combining a glyoxalated copolymer composition and cellulose fibers; or
(b) applying a glyoxalated copolymer composition to a wet or dry web paper or wet or dry board;
wherein the glyoxalated copolymer composition comprises:
the glyoxalated copolymer composition according to claim 1.

17. The method of making paper or board according to claim 16, wherein the glyoxalated copolymer composition is combined with the cellulose fibers or applied to the wet or dry web paper or wet or dry board in amounts ranging from about 0.1 to about 20 pounds dry copolymer per ton of a dry paper furnish.

18. The method according to claim 16, wherein the combining step (a) is selected from the group consisting of:
(a-i) adding the glyoxalated copolymer composition to an aqueous suspension of cellulose fibers;
(a-ii) adding cellulose fibers to the glyoxalated copolymer composition;
(a-iii) adding the glyoxalated copolymer composition and cellulose fibers to an aqueous solution; and
(a-iv) reacting in an aqueous reaction medium comprising cellulose fibers a dry weight ratio of glyoxal:cationic copolymer ranging from about 5 to about 40 glyoxal to about 95 to about 60 cationic copolymer to form the glyoxalated copolymer,
wherein the glyoxalated copolymer is about 0.25 to about 4 weight % based on total weight of the aqueous reaction medium.

19. A paper or board internal strength additive or coating comprising the glyoxalated copolymer composition according to claim 1.

20. A paper or board coated with or comprising the glyoxalated copolymer composition according to claim 1.

21. A paper or board prepared by the method of claim 16.

* * * * *